United States Patent
Lu et al.

(10) Patent No.: US 9,639,216 B2
(45) Date of Patent: May 2, 2017

(54) TOUCH-CONTROL DISPLAY DEVICE WITH INTEGRATION OF CAPACITIVE AND ELECTROMAGNETIC TOUCH UNITS

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Jun Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 79 days.

(21) Appl. No.: 14/074,597

(22) Filed: Nov. 7, 2013

(65) Prior Publication Data

US 2015/0002453 A1    Jan. 1, 2015

(30) Foreign Application Priority Data

Jun. 28, 2013  (CN) .......................... 2013 1 0270785

(51) Int. Cl.
*G06F 3/041* (2006.01)
*G06F 3/044* (2006.01)
*G06F 3/046* (2006.01)

(52) U.S. Cl.
CPC .............. *G06F 3/044* (2013.01); *G06F 3/046* (2013.01); *G06F 3/0416* (2013.01); *G06F 2203/04106* (2013.01)

(58) Field of Classification Search
CPC ...................................................... G06F 3/044
(Continued)

(56) References Cited

U.S. PATENT DOCUMENTS

2004/0105040 A1   6/2004  Oh et al.
2004/0189587 A1*  9/2004  Jung et al. .................... 345/102
(Continued)

FOREIGN PATENT DOCUMENTS

CN   102279689 A   12/2011
CN   102902396 A    1/2013
(Continued)

OTHER PUBLICATIONS

Extended European Search Report for European Application No. 13192086.0, mailed on Feb. 5, 2015, 6 pages total.
(Continued)

*Primary Examiner* — Long D Pham
(74) *Attorney, Agent, or Firm* — Alston & Bird LLP

(57) ABSTRACT

A touch-control display device is disclosed. The display device includes first, second, and third touch-control structures, a first plate, and a second plate opposing the first plate. The first and second touch-control structures form a capacitive touch-control structure, the third touch-control structure is an electromagnetic touch-control structure, and the first, second and third touch-control structures are respectively disposed on an inner side of the first plate, on an external side of the first plate, and on an inner or external side of the second plate. In addition, the first, second, and third touch-control structures are separated by one or more insulating layers.

19 Claims, 6 Drawing Sheets

(58) Field of Classification Search
USPC .......................................................... 345/173
See application file for complete search history.

(56) References Cited

U.S. PATENT DOCUMENTS

| | | |
|---|---|---|
| 2010/0328249 A1 | 12/2010 | Ningrat et al. |
| 2011/0069022 A1* | 3/2011 | Yokota et al. ................ 345/173 |
| 2011/0248838 A1 | 10/2011 | Krahenbuhl et al. |
| 2011/0298748 A1 | 12/2011 | Chen et al. |
| 2012/0086661 A1 | 4/2012 | Shi et al. |
| 2012/0112766 A1 | 5/2012 | Hsu et al. |
| 2012/0169400 A1* | 7/2012 | Liu .............................. 327/517 |
| 2013/0026501 A1 | 1/2013 | Liu |
| 2013/0127776 A1* | 5/2013 | Guard ................... G06F 3/0412 345/174 |
| 2013/0241859 A1* | 9/2013 | Saitoh et al. ................ 345/173 |
| 2014/0002413 A1* | 1/2014 | Kim .............................. 345/174 |

FOREIGN PATENT DOCUMENTS

| | | |
|---|---|---|
| CN | 102955639 A | 3/2013 |
| WO | WO 2012/067073 A1 * | 5/2012 |

OTHER PUBLICATIONS

First Office Action as received in corresponding European Application No. 13192086.0, dated Nov. 16, 2015.
Walker, G., "S3: Fundamentals of Touch Technologies and Applications", presentation dated Jun. 3, 2012.
Office Action as issued in corresponding Chinese Application No. 201310270785.X, dated Apr. 25, 2016, and English-language summary thereof.

* cited by examiner

TOUCH-CONTROL DISPLAY DEVICE WITH INTEGRATION OF CAPACITIVE AND ELECTROMAGNETIC TOUCH UNITS

CROSS-REFERENCES TO RELATED APPLICATIONS

The present application claims priority to Chinese patent application No. 201310270785.X, filed on Jun. 28, 2013, and entitled "TOUCH-CONTROL DISPLAY DEVICE WITH INTEGRATION OF CAPACITIVE AND ELECTROMAGNETIC TOUCH UNITS", the contents of which is incorporated herein by reference in its entirety.

FIELD OF THE DISCLOSURE

The present disclosure generally relates to the touch-control display field, and more particularly, to a touch-control display device with integration of capacitive and electromagnetic touch units.

BACKGROUND OF THE INVENTION

With the development of input and display technologies, a combination of a display device and a touch-control device has become a trend which meets market requirements. In conventional technologies, a display device may have the touch-control function by the following methods. Conventional touch-control devices may be classified into three types: resistive, capacitive and electromagnetic. A resistive or capacitive handwriting input device receives an input signal by identifying a touch event. Generally, a resistive or capacitive handwriting input panel is disposed as an independent part on an external side of a liquid crystal displayer to face a user to receive a touch event. An inductive handwriting panel identifies an input position by receiving an electromagnetic signal of an electromagnetic pen and is generally disposed as an independent part on an external side or the back of a liquid crystal display device, such as the back of a backlight module.

In the above method which realizes a handwriting input function of a liquid crystal display device, a handwriting input panel as an independent part may increase a thickness of a liquid crystal display device, which goes against the development trend in liquid crystal display device of being thin and light-weight. Besides, the installation of a handwriting input panel and a liquid crystal display device may lack of stability and fastness, thereby reducing the input accuracy.

BRIEF SUMMARY OF THE INVENTION

One inventive aspect is a touch-control display device. The display device includes first, second, and third touch-control structures, a first plate, and a second plate opposing the first plate. The first and second touch-control structures form a capacitive touch-control structure, the third touch-control structure is an electromagnetic touch-control structure, and the first, second and third touch-control structures are respectively disposed on an inner side of the first plate, on an external side of the first plate, and on an inner or external side of the second plate. In addition, the first, second, and third touch-control structures are separated by one or more insulating layers.

DETAILED DESCRIPTION OF THE INVENTION

In order to clarify certain objects, characteristics and advantages, specific embodiments are described in detail in conjunction with accompanying drawings. Without departing from the scope of the present invented technology scheme, whatever modification and equivalent variation belong to the protection range of the presented technology scheme.

Embodiment One

Figure 1:
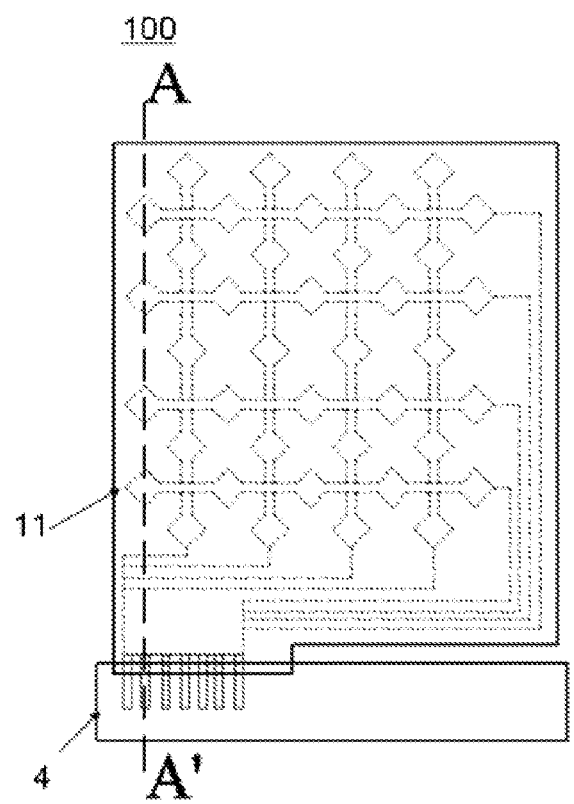
FIG. 1 schematically illustrates a vertical view of a touch-control liquid crystal display device according to a first embodiment of the present disclosure.
Figure 2:
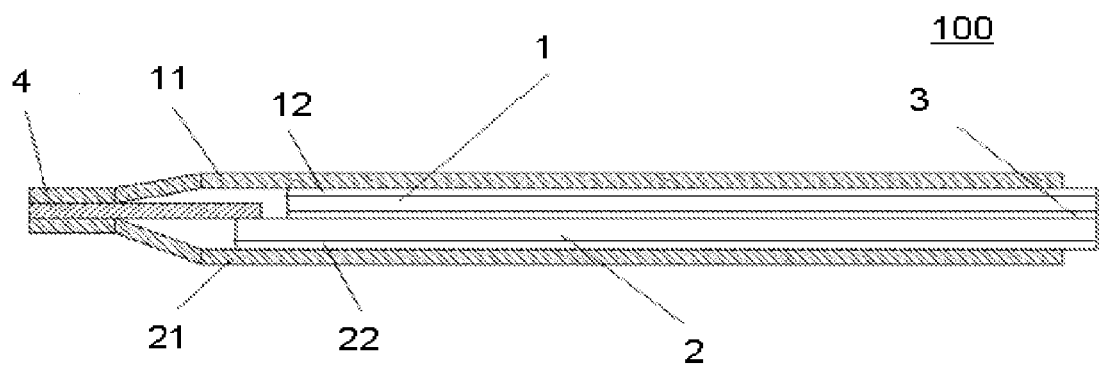
FIG. 2 schematically illustrates a sectional view of the touch-control liquid crystal display device along a A-A' direction in FIG. 1.

A touch-control display device is provided and will be described in conjunction with FIGS. 1 to 6. In the first embodiment, the touch-control display device may be a touch-control liquid crystal display device. FIG. 1 schematically illustrates a vertical view of the touch-control liquid crystal display device according to an embodiment and FIG. 2 schematically illustrates a sectional view of the touch-control liquid crystal display device along a AA' direction in FIG. 1 according to an embodiment. Referring to FIG. 1, the touch-control liquid crystal display device 100 includes a liquid crystal display panel, which includes a first plate 1, a second plate 2 and a liquid crystal layer (not shown) disposed between the first plate 1 and the second plate 2. The first plate 1 may be a color filter plate and the second plate 2 may be an array plate. A pixel array may be disposed on an inner side of the second plate 2. A second touch-control structure 3 may be disposed on one side of the first plate 1 which faces the second plate 2. An upper polarizer 11 may be disposed on an external side of the first plate 1 and a lower polarizer 21 may be disposed on an external side of the second plate 2.

A first touch-control structure 12 may be disposed on one side of the upper polarizer 11 which faces the first plate 1, a third touch-control structure 22 may be disposed on one side of the lower polarizer 21 which faces the second plate 2, and the second touch-control structure 3 may be disposed on one side of the first plate 1 which faces the liquid crystal layer. A plurality of insulating layers including the first plate 1 and the second plate 2 may be disposed between the first touch-control structure 12 and the third touch-control structure 22. Specifically, the first plate 1 is disposed between the second touch-control structure 3 and the first touch-control structure 12, and the second plate 2 is disposed between the second touch-control structure 3 and the third touch-control structure 22. The first plate 1 and the second plate 2 may include an insulating material.

Figure 3:
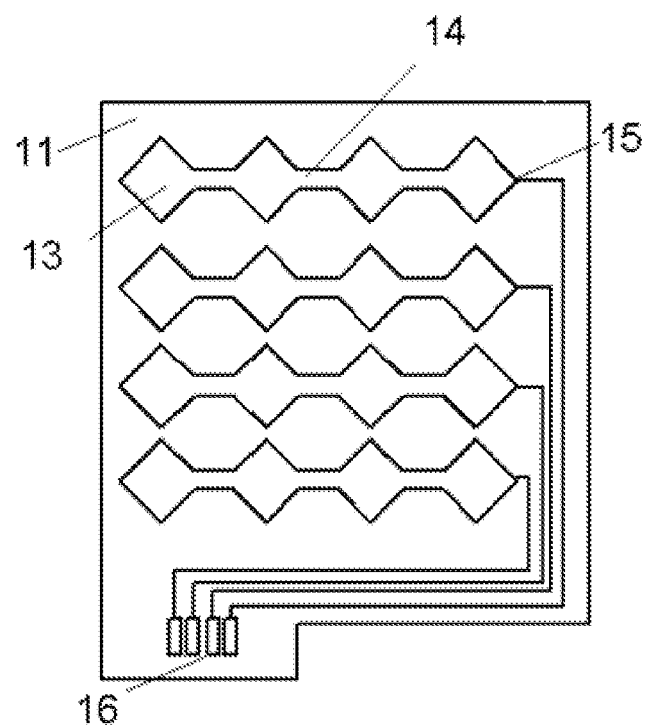
FIG. 3 schematically illustrates a structural diagram of a first touch-control structure 12 of the touch-control liquid crystal display device shown in FIG. 1 according to an embodiment of the present disclosure.

The first touch-control structure 12 and the second touch-control structure 3 constitute a mutual capacitive touch-control structure. Referring to FIG. 3, FIG. 3 schematically illustrates a first touch-control structure 12 according to an embodiment. The first touch-control structure 12 may be formed by: forming a conductive film on the upper polarizer 11; and etching the conductive film to form the first touch-control structure 12. In some embodiments, to ensure a good transmissivity of the liquid crystal display device 100, the conductive film may include a transparent conductive material, such as indium tin oxide. In some embodiments, the first touch-control structure 12 may include a plurality of first touch-control electrodes 13 and a plurality of first connecting lines 14, where the plurality of first touch-control electrodes 13 are connected together by the plurality of first connecting lines 14 to form a plurality of first touch-control lines 15 which extend in a first direction. In the first embodiment, the plurality of first touch-control electrodes 13 may be drive electrodes and the plurality of first touch-control lines 15 may be drive electrode lines.

The upper polarizer 11 has a projection and a plurality of first pins 16 are disposed on the projection. The plurality of first touch-control lines 15 are connected with the plurality of first pins 16 respectively and the other ends of the plurality of first pins 16 are connected with a flexible printed circuit board 4. With such a structure, a capacitor module or an external drive chip may provide drive signals for the plurality of first touch-control lines 15.

Figure 4:
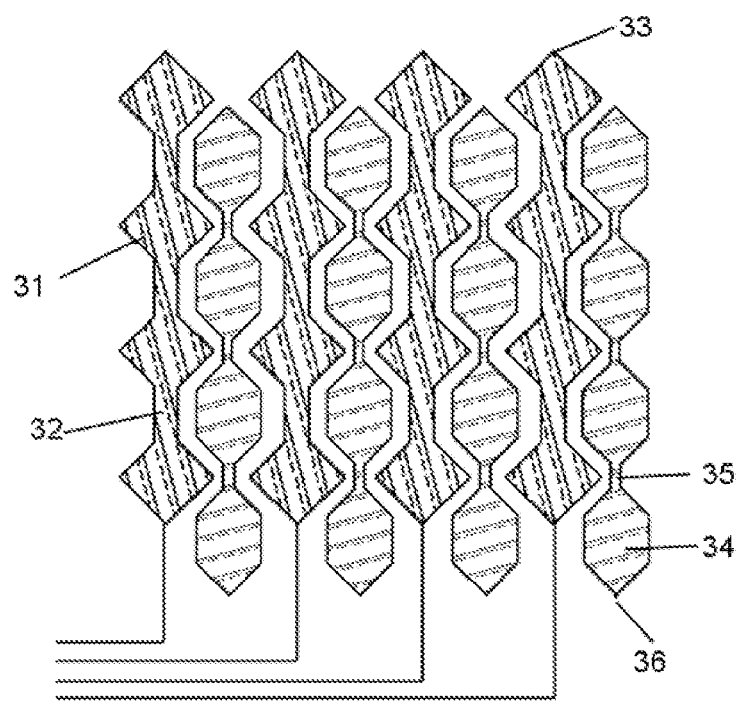
FIG. 4 schematically illustrates a structural diagram of a second touch-control structure 3 of the touch-control liquid crystal display device shown in FIG. 1 according to an embodiment of the present disclosure.

Referring to FIG. 4, FIG. 4 schematically illustrates a second touch-control structure 3 according to an embodiment of the present disclosure. The second touch-control structure 3 may be disposed on a common electrode layer of the liquid crystal display device 100, that is, the second touch-control structure 3 and the common electrode layer of the liquid crystal display device 100 are on a same layer which is used both in display and touch.

In some embodiments, the second touch-control structure 3 may include a plurality of second touch-control electrodes 31, a plurality of second connecting lines 32, where the plurality of second touch-control electrodes 31 are connected together by the plurality of second connecting lines 32 to form a plurality of second touch-control lines 33 which extend in a second direction perpendicular with the first direction. In some embodiments, the plurality of second touch-control electrodes 31 may be sense electrodes and the plurality of second touch-control lines 33 may be sense electrode lines. A plurality of common electrodes 34 and a plurality of common electrode connecting lines 35 may be disposed between two adjacent second touch-control electrodes 31, where the plurality of common electrodes 34 are connected together by the plurality of common electrode connecting lines 35 to form a plurality of common electrode lines 36. One of the plurality of common electrode lines 36 and one of the plurality of second touch-control line 33 may have a gap there between and be insulated from each other. The plurality of common electrode lines 36 and the plurality of second touch-control lines 33 may be connected to an input end of a drive signal respectively. In other embodiments, the plurality of second touch-control electrodes may be drive electrodes and the plurality of second touch-control lines may be drive electrode lines. In other embodiments, the second touch-control structure may be formed on an independent conductive layer and not share one conductive layer with a common electrode layer. In some embodiments, the second touch-control structure may be disposed on an inner side of the second plate.

In the first embodiment, the common electrode layer may be corresponding to a plurality of pixels on the inner side of the second plate 2 and provide common electrode signals to the plurality of pixels. Since the second touch-control structure 3 and the common electrode layer are on the same layer, both the second touch-control electrodes 31 and the common electrodes 34 need to provide common electrode signals to the plurality of pixels when the pixels are driven to display. Besides, gaps between the plurality of second touch-control lines 33 and the plurality of common electrode lines 36 correspond to non-display areas between the plurality of pixels, which ensures a normal display of the plurality of pixels.

Figure 5:
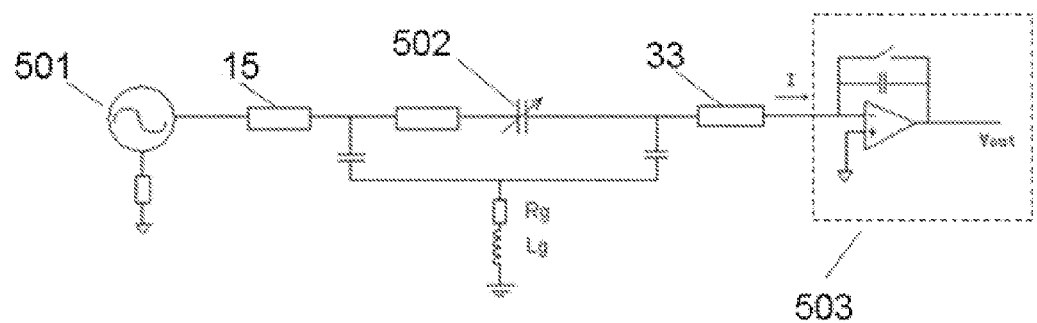
FIG. 5 schematically illustrates an operating diagram of a mutual capacitive touch-control structure formed by first and second touch-control structures according to an embodiment of the present disclosure.

Referring to FIG. 5, FIG. 5 schematically illustrates an operating diagram of a mutual capacitive touch-control structure formed by first and second touch-control structures according to an embodiment of the present disclosure. A drive power supply 501 is connected with the plurality of first touch-control line 15, i.e., drive electrode lines. The first touch-control lines 15 with a certain length may be equivalent to a resistor. The plurality of second touch-control lines 33, i.e., a sense electrode line, may be connected with a detection unit 503. The second touch-control lines 33 with a certain length may be equivalent to a resistor as well. A drive electrode of the first touch-control lines 15 and a sense electrode of the second touch-control lines 33 may form a mutual capacitor 502 on a cross point. When there is a touch event, capacitance of the mutual capacitor 502 may be changed.

A detection method of the mutual capacitive touch-control structure may include: scan the plurality of first touch-control lines 15 in turn, that is, applying drive voltage to one of the plurality of first touch-control lines 15 and connecting the other first touch-control lines 15 to ground each time; and connecting the plurality of second touch-control lines 33 to the detection unit 503 to detect signals on the second touch-control lines 33. When a finger as a conductor touches a surface of a touch-control liquid crystal display device, capacitance of the mutual capacitor 502 on a touched position may be changed because of the capacitive sensing of the finger. The detection unit 503 may detect the change and further determine whether there is a touch event and the position of the touch event. With the mutual capacitive touch-control structure formed by the first and second touch-control structures, it is very simple for a user to perform input operation by using fingers.

Figure 6:
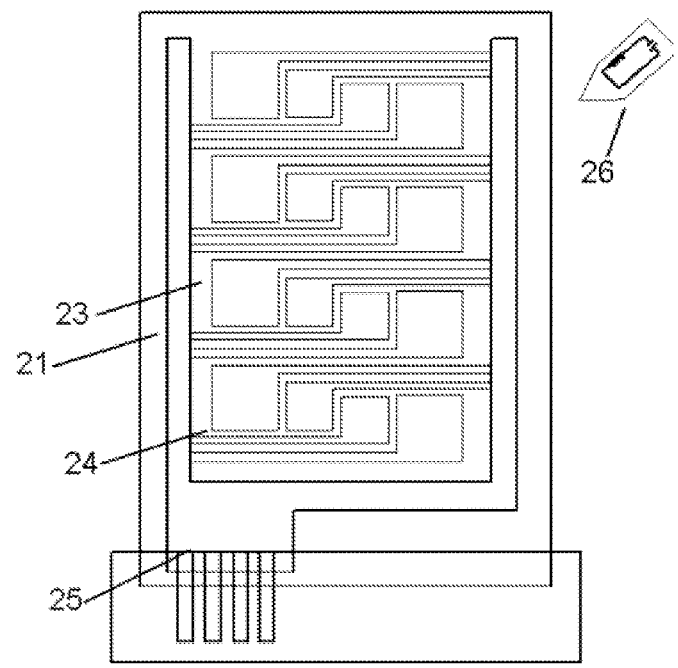
FIG. 6 schematically illustrates a structural diagram of a third touch-control structure according to an embodiment of the present disclosure.

Referring to FIG. 6, a third touch-control structure 22 is shown according to an embodiment of the present disclosure. The third touch-control structure 22 may have an electromagnetic touch-control structure, including a plurality of electromagnetic coils 23 and wires 24 on the lower polarizer 21. The lower polarizer 21 has a projection and a plurality of second pins 25 are disposed on the projection.

The plurality of electromagnetic coils 23 are connected with the plurality of second pins 25 respectively by the wires 24 and the other ends of the plurality of second pins 25 are connected with the flexible printed circuit board 4. With such a structure, an electromagnetic module may provide a drive signal for the third touch-control structure 22. To ensure a good transmissivity of the liquid crystal display device 100, the plurality of electromagnetic coils 23 and the wires 24 may include a transparent conductive material, such as indium tin oxide. The plurality of electromagnetic coils 23 and wires 24 may be formed by: forming an indium tin oxide layer on the lower polarizer 21 and etching the indium tin oxide layer.

While the third touch-control structure 22 is in operation, an electromagnetic pen 26 is needed. In some embodiments, there are two time periods in an operation of the third touch-control structure 22. In the first time period, signals are transmitted to the third touch-control structure 22 through the second pins 25, and the third touch-control structure 22 transmits high frequency electromagnetic waves whose energy may be transmitted into the electromagnetic pen 26. A resonance loop is disposed in the electromagnetic pen 26, thereby the electromagnetic pen 26 may receive electromagnetic waves transmitted by the third touch-control structure 22. In the second time period, the third touch-control structure 22 may stop transmitting electromagnetic waves and switch to receive the electromagnetic waves transmitted back by the electromagnetic pen 26. By detecting the generated inductive current, the third touch-control structure 22 may determine a position and a state of the electromagnetic pen 26 to fulfill touch-control functions. The third touch-control structure 22 may determine a position accurately. When the electromagnetic pen 26 is taken as an input device, writing and drawing are performed by determining the position of the electromagnetic pen 26, which provides more accurate input.

In summary, the touch-control liquid crystal display device disclosed in the first embodiment has the mutual capacitive touch-control structure formed by the fist touch-control structure 12 and the second touch-control structure 3, and the electromagnetic touch-control structure including the third touch-control structure 22, thus, the display device, the capacitive touch-control structure and the electromagnetic touch-control structure may be integrated. That is, both a capacitive touch-control mode and an electromagnetic touch-control mode are provided, thereby a user may use fingers to perform input functions conveniently or use an electromagnetic pen to write or draw more accurately. Besides, the first touch-control structure 12 and the third touch-control structure 22 are formed by coating on a polarizer, and the second touch-control structure 3 and the common electrode layer are on a same layer, thereby the touch-control liquid crystal display device has a small thickness and a thin body.

Figure 7:
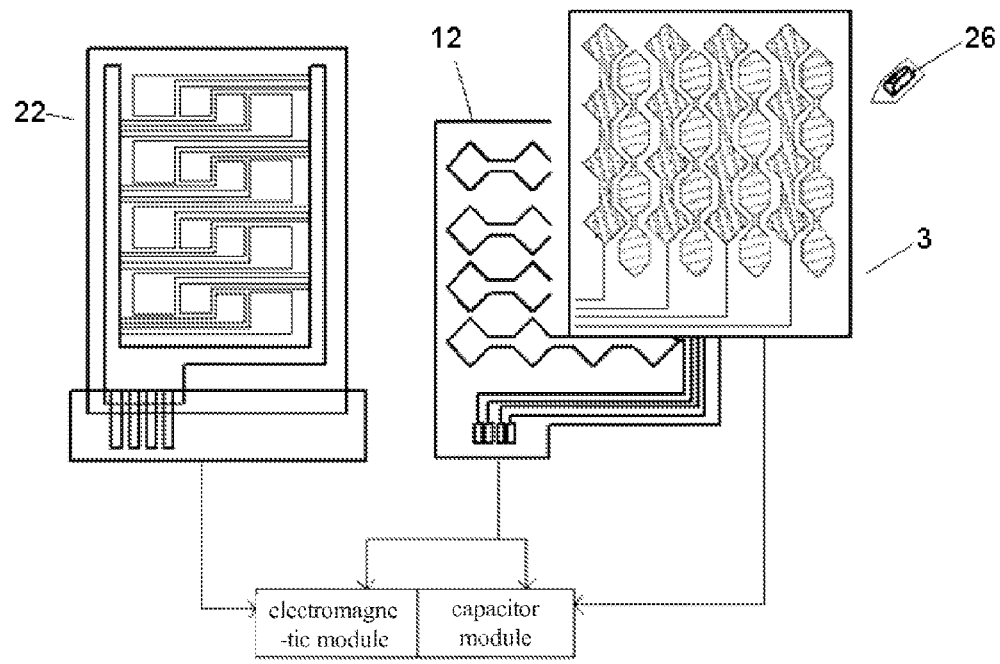
FIGS. 7 and 8 schematically illustrate an example operating mode of the touch-control liquid crystal display device shown in FIG. 1 according to an embodiment of the present disclosure.
Figure 8:
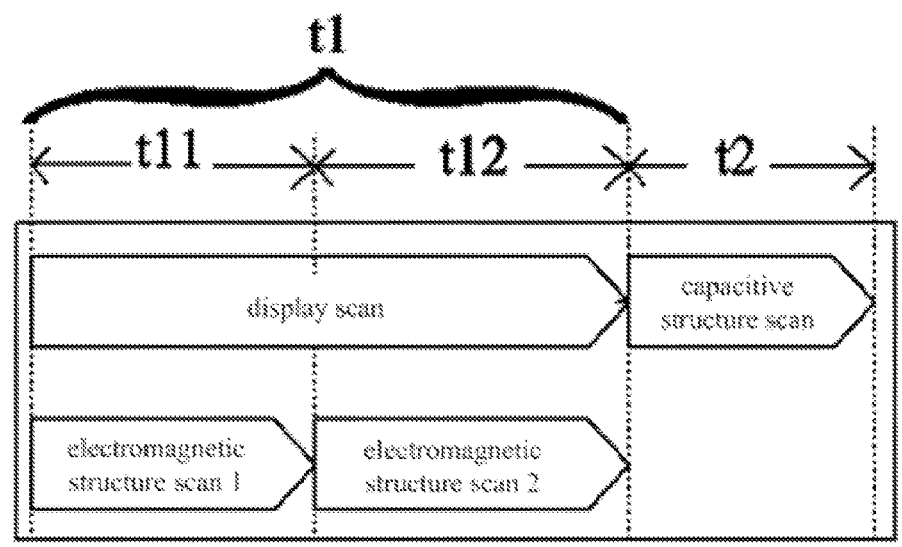

The first touch-control structure 12, the second touch-control structure 3 and the third touch-control structure 22 may operate at the same time or be switched according to user requirements. For example, when the electromagnetic touch-control structure is in operation, the capacitive touch-control structure may be turned off. Referring to FIGS. 7 and 8, FIGS. 7 and 8 schematically illustrate an example operating mode of a touch-control liquid crystal display device 100 according to an embodiment. In the operating mode, there is no need to switch between a capacitive touch-control mode and an electromagnetic touch-control mode, and the two modes may be performed at the same time. To avoid interference between the capacitive touch-control structure and the electromagnetic touch-control structure and achieve a better effect, a scan time period of the capacitive touch-control structure substantially does not overlap or just partially overlaps a scan time period of the electromagnetic touch-control structure. In some embodiments, to avoid interference between the second touch-control lines 33 and the common electrodes of the liquid crystal display device which are disposed in the same conductive layer, a scan time period of the capacitive touch-control structure substantially does not overlap or just partially overlaps a scan time period of the liquid crystal display device.

In some embodiments, during a scan time period t1 of the liquid crystal display device, the liquid crystal display device may be driven to display, during which a common electrode signal is provided for the common electrode lines 36 and the second touch-control lines 33 to drive pixels. After the scan time period t1, i.e., after a display time period of a frame of a picture, a touch-control detection signal may be provided to the first touch-control structure 12 and the second touch-control structure 3. Namely, during the scan time period t1, a common electrode signal is provided for the second touch-control structure 3; and during a scan time period t2 which follows the scan time period t1, a sense electrode signal is provided for the second touch-control structure 3. A changed signal may be transmitted to the capacitor module and the capacitor module may determine whether there is a touch event by detecting variance of the signal and give a feedback.

The scan time period t1 of the liquid crystal display device may be divided into two time periods, t11 and t12. During the time period t11, the third touch-control structure 22 emits electromagnetic waves with a certain frequency. If the electromagnetic pen 26 is in operation, the resonance structure in it which has a resonance frequency may receive the electromagnetic waves. During the time period t12, the third touch-control structure 22 may be switched to receive signals fed back by the electromagnetic pen 26, generate an inductive current in the electromagnetic coils, and transmit the inductive current to an electromagnetic module. The electromagnetic module may determine a position and a state of the electromagnetic pen 26 by reading the inductive current and identifying the size and frequency thereof, and give a feedback. Thus, the third touch-control structure 22 has an operation mode of transmitting and receiving electromagnetic signals, which may not interrupt the display of the liquid crystal display device.

In the touch-control liquid crystal display device with integration of capacitive and electromagnetic touch units provided in the first embodiment, the capacitive touch-control structure and the electromagnetic touch-control structure may operate at the same time, realize different touch-control effects and not interrupt each other.

In some embodiments, during the scan time period t1 of the liquid crystal display device, the third touch-control structure 22, which is an electromagnetic touch-control structure, may perform signal transmission and detection for a plurality of time periods. Generally, a scan time period t1 may be greater than 10 ms while an operation cycle of an electromagnetic touch-control structure is much less than 10 ms. After the third touch-control structure 22 transmits and receives signals during the scan time period t1 for the first time, whether the electromagnetic pen 26 is in operation is determined. If no electromagnetic signal fed back from the electromagnetic pen 26 is detected, the third touch-control structure 22 may not operate any more during the scan time period t1 until a next scan of the liquid crystal display device starts; otherwise, an electromagnetic drive chip may give a feedback. In such an operation mode, the power consumption of the third touch-control structure 22 may be reduced. Furthermore, since an operation cycle of the third touch-control structure 22 is shortened, the electromagnetic pen 26 may get feedback faster, which may improve the accuracy of the third touch-control structure 22.

In some embodiments, the electromagnetic module and the capacitor module may be a same drive chip.

It should be noted that, in other embodiments, the first touch-control electrode may be a sense electrode and the second touch electrode may be a drive electrode. Namely, the first touch-control structure and the second touch-control structure may exchange their positions, which may also realize the same technical effect.

In the first embodiment, the touch-control structures are formed by coating on one side of an upper polarizer and on one side of a lower polarizer to form films and etching the films. In other embodiments, the first, second or third touch-control structures may be formed by coating on an external side of a first plate or a second plate to form a film and etching the film.

In the first embodiment, the first and third touch-control structures may be disposed on inner sides of the upper polarizer and the lower polarizer, respectively. Thus, the upper and lower polarizers can prevent the touch-control structures from being scratched or being corroded by vapor. In other embodiments, the touch-control structures may be disposed on an external side of an upper polarizer or on an external side of a lower polarizer and a protective layer may be formed to protect the touch-control structures, which may realize the same technical effect.

In other embodiments, the first touch-control structure, the second touch-control structure and the third touch-control structure may be disposed on inner sides of the first and second plates. For example, the first and second touch-control structures may be disposed on an inner side of the first plate, an insulating layer is formed between the first and second touch-control structures, and the third touch-control structure is formed in an inner side of the second plate, where the first and second touch-control structures form a capacitive touch-control structure and the third touch-control structure forms an electromagnetic touch-control structure.

In conclusion, the first, second and third touch-control structures may be disposed on an inner side of the first plate, on an external side of the first plate, and on an inner side or an external side of a second plate, respectively, in many ways. Furthermore, as long as the first, second and third touch-control structures are not disposed on a same layer and an insulating layer is formed between each other, the first and second touch-control structures may form a capacitive touch-control structure and the third touch-control structure may form an electromagnetic touch-control structure, whereby the capacitive touch-control function and the electromagnetic touch-control function are integrated.

It should be noted that only some examples for disposing the first, second and third touch-control structures are described in the first embodiment. Those skilled in the art can modify and vary the embodiments without departing from the spirit and scope of the present disclosure.

Embodiment Two

Figure 9:
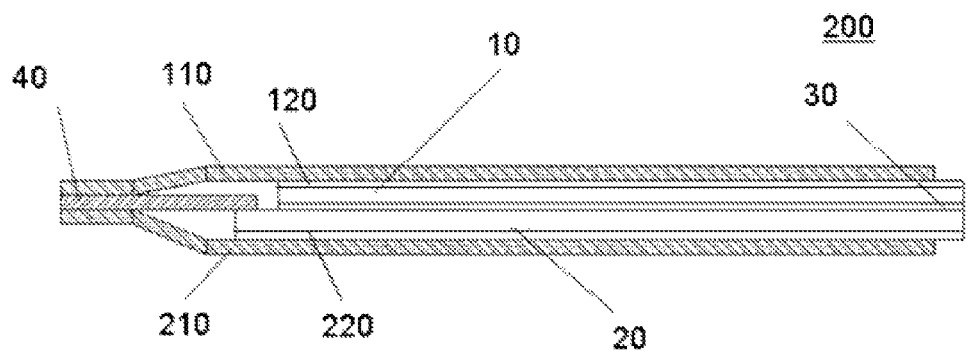
FIG. 9 schematically illustrates a touch-control liquid crystal display device according to a second embodiment of the present disclosure.

FIG. 9 schematically illustrates a touch-control liquid crystal display device according to a second embodiment of the present disclosure. The touch-control liquid crystal display device 200 includes a liquid crystal display panel 10, which includes a first plate 10, a second plate 20 and a liquid crystal layer (not shown) disposed between the first plate 10 and the second plate 20. The first plate 10 may be a color filter plate and the second plate 20 may be an array plate. A pixel array may be disposed on an inner side of the second plate 20. A common electrode layer may be disposed on one side of the first plate 10 which faces the second plate 20. An upper polarizer 110 may be disposed on an external side of the first plate 10 and a lower polarizer 210 may be disposed on an external side of the second plate 20.

A first touch-control structure 120 may be disposed on one side of the upper polarizer 110 which faces the first plate 10, a second touch-control structure 220 may be disposed on one side of the lower polarizer 210 which faces the second plate 20, and a third touch-control structure 30 may be disposed on one side of the first plate 10 which faces the liquid crystal layer.

The difference between the first and the second embodiments is that, in the second embodiment, an electromagnetic touch-control structure formed by the third touch-control structure 30 is inside the liquid crystal display device, and a mutual capacitive touch-control structure formed by the first and second touch-control structures is outside the liquid crystal display device. The details of the mutual capacitive touch-control structure and the electromagnetic touch-control structure may refer to the first embodiment and will not be described in detail here.

The first touch-control structure 120 and the second touch-control structure 220 include a plurality of drive electrode lines and sense electrode lines, respectively, and are connected with a flexible printed circuit board 40 through pins on the upper polarizer 110 and pins on the lower polarizer 120, respectively. The flexible printed circuit board 40 is connected to a drive chip. The third touch-control structure 30 and a common electrode of the liquid crystal panel are on a same layer.

Figure 10:
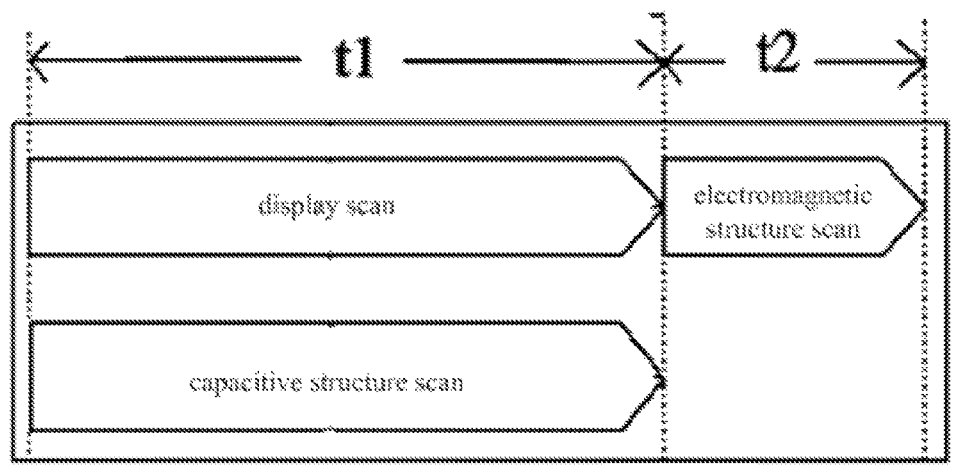
FIG. 10 schematically illustrates an operating diagram of the touch-control liquid crystal display device shown in FIG. 9 according to an embodiment of the present disclosure.

Referring to FIG. 10, FIG. 10 schematically illustrates an operating diagram of the touch-control liquid crystal display device shown in FIG. 9 according to an embodiment of the present disclosure. During a first time period t1, a scan drive signal is provided to the liquid crystal display panel and a drive detection signal is provided to the mutual capacitive touch-control structure including the first touch-control structure 120 and the second touch-control structure 220. During a second time period t2, a touch-control detection signal is provided to the third touch-control structure 30 which forms the electromagnetic touch-control structure. Since the third touch-control structure 30 and the common electrode of the liquid crystal display panel are on the same layer, they do not operate during a same time period. Since the first and second touch-control structures are outside the liquid crystal display device, their operation may not influence the electric filed in the liquid crystal display device and they do operate with the liquid crystal display device at the same time. Therefore, scan of the liquid crystal display device and the capacitive touch-control structure is performed in the first time period t1 and then the scan of the electromagnetic touch-control structure is performed in the second time period t2. Since the scan time period of the electromagnetic touch-control structure is much less than that of the liquid crystal display device, namely, the second time period t2 is much less than the first time period t2, the scan time period of the touch-control liquid crystal display device 200 provided in the second embodiment may be reduced and response speed thereof may be improved. Compared with the first embodiment, during a same scan time period, more time may be left for the liquid crystal display device to scan in the second embodiment, so that a charging time period of a storage capacitor of a pixel may be increased, which may provide a better display effect, or be applied in a liquid crystal display device with a higher resolution.

The touch-control liquid crystal display device 200 provided in the second embodiment may realize the same function with that provided in the first embodiment, where an electromagnetic touch-control structure and a capacitive touch-control structure are integrated in a liquid crystal display device, that is, various touch-control functions are provided and miniaturization of the display device is ensured.

Embodiment Three

Figure 11:
FIG. 11 schematically illustrates a touch-control organic light-emitting diode display device according to a third embodiment of the present disclosure.

FIG. 11 schematically illustrates a touch-control Organic Light-Emitting Diode (OLED) display device according to a third embodiment of the present disclosure. In the first and second embodiments, a liquid crystal display device is taken as an example to illustrate structures of a touch-control display device with integration of capacitive and electromagnetic touch units. Since a liquid crystal display device does not emit or generate light, a backlight plate, an upper polarizer, a lower polarizer, etc., are disposed therein. An OLED display device can emit or generate light itself, so that it is thin and light and has low energy consumption, which may have better application prospects than the liquid crystal display device. In the third embodiment, the structure of a touch-control display device with integration of capacitive and electromagnetic touch units is described by taking an OLED display device as an example.

Referring to FIG. 11, the OLED display device 300 includes a first plate 100 and a second plate 200 opposite to the first plate 100. The first plate 100 is a cover glass and the second plate 200 is an array plate which has pixels and an illuminant material disposed thereon. A first touch-control structure 120 may be disposed on an external side of the first plate 100, a second touch-control structure 30 may be disposed on an inner side of the first plate 100, and a third touch-control structure 220 may be disposed on an external side of the second plate 200. The first and second touch-control structures form a capacitive touch-control structure and the third touch-control structure 220 forms an electromagnetic touch-control structure. The details of the first, second and third touch-control structures may refer to the first and second embodiments and will not be described in detail here.

To reduce interference between the capacitive touch-control structure and the OLED display device 300, a scan time period of the capacitive touch-control structure substantially does not overlap or just partially overlaps a scan time period of the OLED display device 300. A scan time period of the electromagnetic touch-control structure overlaps or partially overlaps a scan time period of the OLED display device 300. Since the electromagnetic touch-control structure formed by the third touch-control structure 220 is disposed on the external side of the OLED display device 300, it may have little effect on the operation of pixels. Therefore, the scan time period of the electromagnetic touch-control structure may overlap the scan time period of the OLED display device 300, which may reduce the scan cycle.

In some embodiments, to ensure a good transmissivity of the OLED display device 300, the first, second and third touch-control structures may include a transparent conductive material, such as indium tin oxide, and may be formed by coating on an inner or external side of the first or second plate to form a film and etching the film.

In some embodiment, other display devices, such as electronic paper display devices, may be employed to form a touch-control display device with integration of electromagnetic and capacitive touch units. Generally, a touch-control display device with integration of electromagnetic and capacitive touch units is formed by: forming a first plate, a second plate opposite to the first plate, and a display layer between the first and second plates; and disposing a first touch-control structure, a second touch-control structure and a third touch-control structure on an inner side or external side of the first and second plates reasonably.

In some embodiments, the first, second and third touch-control structures may be disposed on an inner side of the first plate, on an external side of the first plate, and on an inner side or an external side of the second plate, respectively. Furthermore, in some embodiments, the first, second and third touch-control structures are not disposed on a same layer and an insulating layer may be formed there between to form the electromagnetic touch-control structure and the capacitive touch-control structure. Not all of the methods for disposing the first, second and third touch-control structures are described in detail in the third embodiment. It should be understood that various changes may be made in the function and arrangement of elements without departing from the spirit and scope of the invention.

Although various aspects have been disclosed above with reference to certain specific embodiments, it should be understood that the disclosure is presented by way of example only, and not limitation. Those skilled in the art can modify and vary the embodiments without departing from the spirit and scope of the present disclosure.

What is claimed is:

1. A touch-control display device, comprising:
   a display device, comprising:
      a first plate;
      a liquid crystal display layer below the first plate;
      a second plate disposed at the lower side of liquid crystal display layer;
      an upper polarizer disposed on the top side of the first plate;
      a lower polarizer disposed on the bottom side of the second plate;
      a first touch-control structure sandwiched between the upper polarizer and the first plate;
      a second touch-control structure forming a capacitive touch-control with the first touch-control structure; and
      a third touch-control structure forming an electromagnetic touch-control;
      wherein at least one of the upper polarizer and the lower polarizer comprises a projection, wherein a pin is disposed on one side of the projection which faces the liquid crystal display device, and is configured to transmit a drive signal to the touch-control structures, and
      wherein the second touch-control structure is disposed between the first plate and the liquid crystal layer, and the third touch-control structures is sandwiched between the second plate and the lower polarizer, or the third touch-control structure is sandwiched between the first plate and the liquid crystal display layer, and the second touch-control structure is sandwiched between the second plate and the lower polarizer.

2. The touch-control display device according to claim 1, wherein the display device is a liquid crystal display device.

3. The touch-control display device according to claim 1, wherein the first touch-control structure comprises a plurality of first touch-control electrodes and a plurality of first connecting lines, wherein the plurality of first touch-control electrodes are connected together by the plurality of first connecting lines to form a first touch-control line which extends in a first direction.

4. The touch-control display device according to claim 3, wherein the second touch-control structure comprises a plurality of second touch-control electrodes and a plurality of second connecting lines, wherein the plurality of second touch-control electrodes are connected together by the plurality of second connecting lines to form a second touch-control line which extends in a second direction perpendicular to the first direction.

5. The touch-control display device according to claim 1, wherein the first, second and third touch-control structures comprise a transparent conductive material.

6. The touch-control display device according to claim 1, further comprises a common electrode layer below the first plate, wherein the second touch-control structure and the common electrode layer of the liquid crystal display device are on a same layer.

7. The touch-control display device according to claim 1, wherein during a scan cycle, a scan time period of the electromagnetic touch-control structure substantially does not overlap a scan time period of the capacitive touch-control structure.

8. The touch-control display device according to claim 1, wherein during a scan cycle, a scan time period of the touch-control structure formed inside the display device substantially does not overlap or just partially overlaps a scan time period of the display device.

9. The touch-control display device according to claim 1, wherein during a scan cycle, a scan time period of the touch-control structure formed outside the display device at least partly overlaps a scan time period of the display device.

10. The touch-control display device according to claim 9, wherein the third touch-control structure is disposed on an internal side of the display device, and during the scan time period of the display device, the electromagnetic touch-control structure scans a plurality of times.

11. The touch-control display device according to claim 10, wherein, in response to not receiving a signal fed back by an external electromagnetic pen during a first scan time period, the electromagnetic touch-control structure stops scanning during the first scan time.

12. A touch-control display device, comprising:
a display device, comprising:
a first plate, and
a second plate opposing the first plate;
a first touch-control structure;
a second touch-control structure; and
a third touch-control structure, wherein the first and second touch-control structures form a capacitive touch-control structure, and the third touch-control structure is an electromagnetic touch-control structure, wherein one or two of the first, second and third touch-control structures are disposed on an inner side of the first plate or on an inner side of the second plate and the rest of the first, second and third touch-control structures is disposed on an external side of the first plate or an external side of the second plate, wherein the first, second and third touch-control structures are separated by one or more insulating layers, the inner side of the first plate and the inner side of the second plate face each other, and the external side of the first plate and the external side of the second plate face away from each other, wherein the display device is a liquid crystal display device and the display device further comprises an upper polarizer disposed on an external side of the first plate and a lower polarizer disposed on an external side of the second plate, and wherein at least one of the upper polarizer and the lower polarizer comprise a projection, where a pin is disposed on one side of the projection which faces the liquid crystal display device, and is configured to transmit a drive signal to the touch-control structures.

13. The touch-control display device according to claim 12, wherein the first, second or third touch-control structure is disposed on an external side of the upper polarizer or on an external side of the lower polarizer, and the first, second and third touch-control structures are not disposed on a same layer.

14. The touch-control display device according to claim 13, wherein the touch-control structure formed on the inner side of the first plate and a common electrode layer of the liquid crystal display device are on a same layer.

15. The touch-control display device according to claim 12, wherein during a scan cycle, a scan time period of the electromagnetic touch-control structure substantially does not overlap a scan time period of the capacitive touch-control structure.

16. The touch-control display device according to claim 12, wherein during a scan cycle, a scan time period of the touch-control structure formed inside the display device substantially does not overlap or just partially overlaps a scan time period of the display device.

17. The touch-control display device according to claim 16, wherein the third touch-control structure is disposed on an external side of the display device.

18. The touch-control display device according to claim 12, wherein during a scan cycle, a scan time period of the touch-control structure formed outside the display device at least partly overlaps a scan time period of the display device.

19. The touch-control display device according to claim 18, wherein the third touch-control structure is disposed on an internal side of the display device, and during the scan time period of the display device, the electromagnetic touch-control structure scans a plurality of times.

\* \* \* \* \*